(12) United States Patent
Wu et al.

(10) Patent No.: US 10,232,348 B2
(45) Date of Patent: Mar. 19, 2019

(54) DOPED CATALYST SUPPORT MATERIALS HAVING OXYGEN STORAGE CAPACITY (OSC) AND METHOD OF MAKING THEREOF

(71) Applicant: Pacific Industrial Development Corporation, Ann Arbor, MI (US)

(72) Inventors: Wei Wu, Ann Arbor, MI (US); Yunkui Li, Ann Arbor, MI (US); Jeffery Lachapelle, Northville, MI (US); David Shepard, Ann Arbor, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 6 days.

(21) Appl. No.: 15/184,247

(22) Filed: Jun. 16, 2016

(65) Prior Publication Data

US 2016/0296910 A1 Oct. 13, 2016

Related U.S. Application Data (63) Continuation-in-part of application No. 15/179,122, filed on Jun. 10, 2016, now Pat. No. 9,597,666, which
(Continued)

(51) Int. Cl.
*B01J 23/10* (2006.01)
*B01J 23/72* (2006.01)
(Continued)

(52) U.S. Cl.
CPC ............ *B01J 23/10* (2013.01); *B01D 53/945* (2013.01); *B01J 23/22* (2013.01); *B01J 23/72* (2013.01);
(Continued)

(58) Field of Classification Search
CPC . B01J 23/63; B01J 21/066; B01J 21/04; B01J 23/10; B01J 23/22; B01J 23/72;
(Continued)

(56) References Cited

U.S. PATENT DOCUMENTS 4,868,150 A 9/1989 Spooner et al.
5,593,654 A 1/1997 Decker et al.
(Continued)

FOREIGN PATENT DOCUMENTS

EP 1618951 1/2006
EP 1712279 10/2006
(Continued)

OTHER PUBLICATIONS

Dutta, Origin of Enhanced Reducibility/Oxygen Storage Capacity of Ce1—xTixO2 Compared to CeO2 or TiO2, 2006, Chem. Mater., 18, 3249-3256.*
(Continued)

*Primary Examiner* — James A Fiorito
(74) *Attorney, Agent, or Firm* — Brinks Gilson & Lione (57) ABSTRACT

A catalyst support material (D-CZMLA) with oxygen storage capacity corresponds to the formula $vD:x(Ce_{1-w}Zr_wO_2):yM:zL:(1-v-x-y-z)Al_2O_3$, wherein w is a molar ratio between 0.1-0.8 and v, x, y, and z are weight ratios, such that v is between 0.005-0.15, x is between 0.05-0.80, and y and z are between 0.001-0.10. M is an interactive promoter for oxygen storage, L is a stabilizer (L) for the $Al_2O_3$ support; and D is an oxidizing dopant. The catalyst support material can be incorporated into a wash coat that combines platinum group metals (PGM), an adhesive, and a mixture of $(\alpha)RE-Ce-ZrO_2+(\beta)CZMLA+(1-\alpha-\beta)RE-Al_2O_3$, wherein $RE-Ce-ZrO_2$ is a rare earth element stabilized ceria zirconia having a weight ratio ($\alpha$) between 0-0.7; CZMLA is the doped catalyst support material having a weight ratio ($\beta$)
(Continued)

between 0.2-1, such that $(\alpha+\beta) \leq 1$; and $RE-Al_2O_3$ is rare earth element stabilized alumina having a weight ratio equal to $(1-\alpha-\beta)$.

18 Claims, 4 Drawing Sheets

Related U.S. Application Data is a continuation of application No. 13/996,073, filed as application No. PCT/US2011/066715 on Dec. 22, 2011, now Pat. No. 9,387,461.

(60) Provisional application No. 61/425,958, filed on Dec. 22, 2010.

(51) Int. Cl.
| | | |
|---|---|---|
| *B01J 35/10* | (2006.01) | |
| *B01D 53/94* | (2006.01) | |
| *B01J 23/22* | (2006.01) | |
| *B01J 23/83* | (2006.01) | |
| *B01J 37/00* | (2006.01) | |

(52) U.S. Cl.
CPC ........... *B01J 23/83* (2013.01); *B01J 35/1014* (2013.01); *B01J 35/1038* (2013.01); *B01J 35/1042* (2013.01); *B01J 35/1061* (2013.01); *B01J 37/0018* (2013.01); B01D 2255/102 (2013.01); B01D 2255/2042 (2013.01); B01D 2255/2061 (2013.01); B01D 2255/2063 (2013.01); B01D 2255/2092 (2013.01); B01D 2255/20707 (2013.01); B01D 2255/20723 (2013.01); B01D 2255/20738 (2013.01); B01D 2255/20746 (2013.01); B01D 2255/20753 (2013.01); B01D 2255/20761 (2013.01); B01D 2255/407 (2013.01); B01D 2255/908 (2013.01); B01J 2523/00 (2013.01); Y02T 10/22 (2013.01)

(58) Field of Classification Search
CPC .... B01J 23/83; B01J 35/1014; B01J 35/1038; B01J 35/1042; B01J 35/1061; B01J 37/0018; B01D 53/945
USPC .................................................. 502/304, 349
See application file for complete search history.

(56) References Cited

U.S. PATENT DOCUMENTS

| 6,133,194 A | 10/2000 | Cuif et al. | |
|---|---|---|---|
| 2002/0192150 A1 | 12/2002 | Glazov et al. | |
| 2008/0009410 A1 | 1/2008 | Okamoto et al. | |
| 2009/0258781 A1 | 10/2009 | Maruki et al. | |
| 2009/0324468 A1* | 12/2009 | Golden | B01D 53/945 423/210 |
| 2010/0040523 A1* | 2/2010 | Larcher | B01D 53/945 423/213.2 |
| 2010/0285956 A1 | 11/2010 | Li | |

FOREIGN PATENT DOCUMENTS

| EP | 2127744 | 12/2009 |
|---|---|---|
| WO | 2009029070 | 3/2009 |

OTHER PUBLICATIONS

Total Materia, https://www.totalmateria.com/page.aspx?ID=CheckArticle&site=ktn&NM=237 (Year: 2010).*
European Patent Office, Rijswijk, Netherlands, International Search Report of International Application No. PCT/US2011/066715, dated Dec. 18, 2012, 3 pages.
He, Xiaokun, et al.; Influence of $Al_2O_3$/CeZrAl Composition on the Catalytic Behavior of Pd/Rh catalyst; ScienceDirect; Journal of Rare Earths; vol. 28, No. 1, Feb. 2010, pp. 59-63.
Hilliard, Henry E.; Platinum-Group Metals; U.S. Geological Survey Publications—Minerals Information.
Wang, Jun, et al.; Effect of Interaction Between $Ce_{0.7}Zr_{0.3}O_2$ and $Al_2O_3$ on Structurals Characteristics, Thermal Stability, and Oxygen Storage Capacity; J. Phys. Chem. C (2008), vol. 112, No. 13; pp. 5113-5122.
Wei, Zhenling, et al.; Preparation and Property Investigation of $CeO_2$—$ZrO_2$—$Al_2O_3$ Oxygen-Storage Compounds; Journal of Alloys and Compounds; vol. 455 (2008), pp. 322-326.
Zahir, Hasan, M.D., et al.; Preparation and Characterization of Mesoporous Ceria-Zirconia-Alumina Nanocomposite with High Hydrothermal Stability; J. Mater. Res., vol. 22, No. 11 (Nov. 2007); pp. 3201-3209.
Zahir, Hasan, M.D., et al.; Mesoporous $CeO_2$—$ZrO_2$—y—$Al_2O_3$ Nanocomposite Membranes Exhibiting Remarkable Hydrothermal Stability; Desalination and Water Treatment; vol. 2; (2009); pp. 223-230.
Zhang, Xiaoyu, et al.; $CeO_2$—$ZrO_2$—$La_2O_3$—$Al_2O_3$ Composite Oxide and its Supported Palladium Catalyst for the Treatment for Exhaust of Natural Gas Engined Vehicles; Journal of Natural Gas Chemistry, vol. 18; (2009); pp. 139-144.
Zhang, Qingwei, et al.; Effect of Different Mixing Ways in Palladium/Ceria-Zirconia/Alumina Preparation on Partial Oxidation of Methane; Journal of Rare Earths; vol. 23, No. 5; (Oct. 2008); p. 700.
Zhao, Bo, et al; Preparation of $Ce_{0.67}Zr_{0.33}O_2$ Mixed Oxides as Supports of Improved Pd-only Three-Way Catalysts; Applied Catalysis B: Environmental 96 (2010) pp. 338-349.

* cited by examiner

DOPED CATALYST SUPPORT MATERIALS HAVING OXYGEN STORAGE CAPACITY (OSC) AND METHOD OF MAKING THEREOF

CROSS-REFERENCE TO RELATED APPLICATIONS

This application is a continuation-in-part of U.S. Non-Provisional application Ser. No. 15/179,122 filed Jun. 10, 2016, which is a continuation of U.S. Non-Provisional application Ser. No. 13/996,073, filed Jun. 20, 2013, which is the National Stage of International Application No. PCT/US2011/066715 filed Dec. 22, 2011, designating the United States and published in English, which claims the benefit of the filing date under 35 U.S.C. § 119(e) of U.S. Provisional Application No. 61/425,958 filed Dec. 22, 2010, the entire contents of each of which are hereby incorporated herein by reference.

FIELD

The invention relates to inorganic complexes, especially to catalyst support materials having oxygen storage capacity and high thermal stability, their method of manufacture and applications thereof. The materials of this disclosure are incorporated into wash-coats of gasoline or diesel engine exhaust catalytic converters.

BACKGROUND

The statements in this section merely provide background information related to the present invention and may not constitute prior art.

A typical wash coat includes a catalyst support of gamma, delta, and theta alumina or lanthanum (La) stabilized alumina, Ce—$ZrO_2$ with oxygen storage capacity and Platinum group metals (PGM), such as Pt, Pd, and Rh introduced by nitrate solutions. The PGM can be coated on the cordierite honeycomb substrate combined in the slurry mixture of the catalyst support material and oxygen storage material or the PGM can be coated as separate step following the coating of the wash coat slurry (catalyst support material and oxygen storage material) to make the catalyst. The function of the catalyst is to change most of the pollution of the atmosphere from mobile engine exhaust consisting of carbon monoxide (CO), all kinds of hydrogen carbon compounds (HC), and nitrogen oxygen compounds ($NO_x$) into innocuous carbon dioxide ($CO_2$), water ($H_2O$), and Nitrogen ($N_2$).

As a catalyst support, large fresh specific surface area (SSA) is necessary to supply as many as possible catalytic active sites, meanwhile the thermal stability at high temperature is also very important to maintain catalytic activity of separated sites during operation. High SSA and highly thermal stable La-alumina is a typical catalyst support material.

As an important composition of a three-way catalyst (TWC), zirconia-stabilized ceria and other ceria-based oxides play a major role in oxygen storage and release under lean and rich fuel conditions, thereby, enabling the oxidation of CO and volatile organics and the reduction of $NO_N$. High efficient catalytic performance also relates to high specific surface area and thermal stability, as well as high oxygen storage capacity.

Pure ceria is the best oxygen storage material, but its poor thermal stability limits its application at high temperature. Zirconia stabilized ceria, $CeO_2$—$ZrO_2$, has improved the materials' thermal stability and oxygen storage capacity compared with $CeO_2$. The complex oxide with a molar ratio of Ce to Zr of 1:1 can form a solid solution $Ce_{0.5}Zr_{0.5}O_2$ of cubic phase, which improves OSC performance. Nevertheless, the thermal stability of this kind of material is poor after aging at high temperature, for example, after aging at 1000° C. for several hours, the specific surface area of this material will typically be less than 30 $m^2/g$.

Alumina is one example of a thermal stabilizer additive for use with $CeO_2$—$ZrO_2$. Other additives include alkaline earth, rare earth and silicon elements or mixture thereof. The total amount of such stabilizers added is usually controlled to be less than 10 wt. % based on the entire amount of oxides present. However, more recently, up to 90 wt. % alumina has been added into $CeO_2$—$ZrO_2$ for improving thermal stability and OSC. The introduction of alumina into Ce—Zr oxide results in efficient improvement of thermal stability and OSC.

Normally 30-70% Ce—Zr oxide is mixed with La-gamma alumina and platinum group metals (PGM) to make wash coat in a typical TWC application. Ceria-zirconia manufacturing cost is much higher than alumina due to the use of much more organic materials and/or a hydrothermal process. Accordingly, there exists a desire to provide new types of catalyst support materials having high thermal stability and high OSC in order to reduce the usage of Ce—$ZrO_2$ or eliminate the usage of Ce—$ZrO_2$.

SUMMARY

The present disclosure generally provides a catalyst support material (D-CZMLA) that exhibits oxygen storage capacity. The catalyst support material (D-CZMLA) comprises, consists of, or consists essentially of: ceria-zirconia, which has oxygen storage capacity; an interactive promoter (M) for oxygen storage; an aluminum oxide support; a stabilizer (L) for the aluminum oxide support; and an oxidizing dopant (D). The catalyst support material (D-CZMLA) has the formula F-1:

$$vD{:}x(Ce_{1-w}Zr_wO_2){:}yM{:}zL{:}(1-v-x-y-z)Al_2O_3 \qquad (F\text{-}1)$$

in which w is a molar ratio between 0.1 and about 0.8; and v, x, y, and z are weight ratios, such that v is in the range of 0.005 to 0.15; x is within the range of about 0.05 to about 0.80, while y and z are within the range of 0.001 to about 0.10. The combined weight percentage range of the dopant, the ceria-zirconia, the interactive promoter, and the stabilizer (v+x+y+z) may range from about 5 wt. % to about 80 wt. % relative to the total oxides in the catalyst support material.

According to one aspect of the present disclosure, the interactive promoter (M) and the stabilizer (L) are independently selected as a rare earth oxide. When desirable, M and L may be compositionally different from one another. The oxidizing dopant (D) is selected as an alkaline earth oxide or a transition metal oxide. Alternatively, the oxidizing dopant (D) is an oxide of copper, cobalt, iron, nickel, titanium, vanadium, strontium, barium, or a mixture thereof. Alternatively, the catalyst support material may comprise lanthanum oxide as the interactive promoter (M), yttrium oxide as the stabilizer (L), and copper oxide as the oxidizing dopant (D).

According to another aspect of the present disclosure, the catalyst support material may further comprise a catalyst support core powder having a formula F-2:

$$vD{:}x_1(Ce_{1-w}Zr_wO_2){:}y_1M{:}zL{:}(1-v-x_1-y-z)Al_2O_3 \qquad (F\text{-}2)$$

and a solid solution coated onto the core powder having a formula F-3:

$$x_2(Ce_{1-w}Zr_wO_2){:}y_2M \quad (F\text{-}3)$$

wherein $x_2=x-x_1$ and $y_2=y-y_1$ and in which $0.2 \le x_1/x \le 0.8$ and $0.2 \le y_1/y \le 0.8$.

According to another aspect of the present disclosure, the ceria-zirconia may exhibit a cubic or tetragonal phase and the alumina may exhibit a weak gamma phase. The catalyst support material may exhibit a particle size ($D_{50}$) in the range of 1 to 100 microns. The catalyst support material may also have a fresh specific surface area (SSA) that is greater than 80 $m^2/g$ and a specific surface area (SSA) that is greater than 45 $m^2/g$ after being subjected to hydrothermal aging at 1,000° C. In addition, the catalyst support material may exhibit a specific surface area (SSA) that is greater than 20 $m^2/g$ after being subjected to hydrothermal aging at 1,100° C.

According to another aspect of the present disclosure, a wash coat for a catalyst having high thermal stability and oxygen storage capacity (OSC) for use in an automobile engine exhaust converter is provided. This wash coat comprises: at least one platinum group metal (PGM); an adhesive; and a mixture of catalyst supports according to the formula F-5:

$$(\alpha)RE\text{-}Ce\text{-}ZrO_2 + (\beta)D\text{-}CZMLA + (1-\alpha-\beta)RE\text{-}Al_2O_3 \quad (F\text{-}5)$$

wherein, RE-Ce-$ZrO_2$ is an OSC material of rare earth elements stabilized ceria zirconia having a weight ratio ($\alpha$) ranging from 0 to about 0.7; D-CZMLA is a doped catalyst support material having a weight ratio ($\beta$) ranging from about 0.2 to about 1 such that $(\alpha+\beta) \le 1$; and RE-$Al_2O_3$ is a rare earth elements stabilized alumina support having a weight ratio equal to $(1-\alpha-\beta)$. The D-CZMLA corresponds to the doped catalyst support material as previously described above and further defined herein. When desirable, the D-CZMLA may further comprises a catalyst support core powder having a formula F-2 and a solid solution coated onto the core powder having a formula F-3, as previously described above an further defined herein.

According to another aspect of the present disclosure, the wash coat exhibits an activation temperature that is at least 35% lower than the activation temperature of a similar wash coat formulation that does not include the dopant. Alternatively, the wash coat has an activation temperature that is at least 50% lower than the activation temperature of a similar wash coat formulation that does not include the dopant.

According to yet another aspect of the present disclosure, the D-CZMLA may be formed by a method comprising, consisting of, or consisting essentially of: providing a basic solution of an aluminum oxide precursor; providing an acidic solution, mixing the basic solution and the acidic solution together to form a neutralized solution; allowing the neutralized solution to further mix at a predetermined temperature causing a precipitate to form; filtering the neutralized solution to collect the precipitate; washing the precipitate to remove soluble impurities; adding the precipitate to water to form a slurry; spray drying the slurry to obtain the catalyst support core powder; calcining the catalyst support core powder at a predetermined temperature; and optionally, coating a solid solution onto the catalyst support core powder. The acidic solution utilized in this method includes precursors to the cerium zirconia, the interactive promoter, the dopant, and the stabilizer.

When desirable, the method may further include the step of adding at least one surfactant to the slurry. The surfactant may include, but not be limited to, polyvinyl alcohol (PVA), polyvinyl amine, polyethylene glycol-200 (PEG-200), isopropyl alcohol (IPA), ethanol, and melamine, or combination thereof.

Further areas of applicability will become apparent from the description provided herein. It should be understood that the description and specific examples are intended for the purpose of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the description and drawings, corresponding reference numerals indicate like or corresponding parts and features.

The present disclosure generally provides a catalyst support material (D-CZMLA) having a high oxygen storage capacity (OSC) according to formula (F-1):

$$vD{:}x(Ce_{1-w}Zr_wO_2){:}yM{:}zL{:}(1-v-x-y-z)Al_2O_3 \quad (F\text{-}1)$$

in which, $Ce_{1-w}Zr_wO_2$ is the oxygen storage composition with the subscript w, a molar ratio ranging from 0.1 to about 0.8 and x being a weight ratio ranging from about 0.05 to about 0.80; D is an oxidizing dopant with a weight ratio v ranging from 0.005 to 0.15; M is an interactive promoter for the oxygen storage capacity with weight ratio y ranging from 0.001 to about 0.10; and L is a stabilizer for the $Al_2O_3$ support with weight ratio z ranging from 0.001 to about 0.10. The weight percentage range of ceria-zirconia and other metal and rare earth oxides (v+x+y+z) in the composition is from about 5 to about 80 wt. % relative to the total oxides present. The remainder (1−x−y−z) represents the amount of alumina or aluminum oxides that are present.

The oxidizing dopant, D, may be chosen to be any alkaline earth oxide or a transition metal oxide. Alternatively, the dopant, D, is an oxide of copper, cobalt, iron, nickel, titanium, vanadium, strontium, barium, or a mixture thereof. Alternatively, the dopant, D, is copper oxide (CuO). The dopants have the capability of storing oxygen with different oxidation states. Thus the use of the dopants in the catalyst support material (D-CZMLA) increases the oxygen storage capacity (OSC) of the catalyst support material (CZMLA) without the dopant.

The interactive promoter, M, may be chosen as any rare earth oxide, including elements represented in the periodic table with atomic element No.'s 21, 39 and 57-71 in the element periodic table, as well as any combination thereof. The interactive promoter, M, is selected for its oxygen storage capacity. Alternatively, the interactive promoter, M, is lanthanum oxide ($La_2O_3$).

The support stabilizer, L, may be chosen may be chosen as any rare earth oxide, including elements represented in the periodic table with atomic element No.'s 21, 39 and 57-71 in the element periodic table, as well as any combination thereof. The stabilizer, L, is chosen due to its ability to provide thermal stabilization to the structure of the aluminum oxide support. Alternatively, the interactive promoter, L, is yttrium oxide ($Y_2O_3$).

L and M may be chosen to comprise different rare earth metal oxides. However, when desirable, L and M may be chose to be the same rare earth metal oxide. Thus, in some cases, M or L can act as both OSC promoter and as thermal stabilizer.

The doped catalyst support material is described throughout the specification as D-CZMLA, in which D represents the dopant, CZ represents the ceria-zirconia composition, M is the interactive promoter, L is the support stabilizer, and A is the aluminum oxide support. Individual oxides may also be represented as a letter or letters in the descriptor without exceeding the scope of the specification. For example, when the dopant is CuO, the interactive promoter is $La_2O_3$, the support stabilizer is $Y_2O_3$, the doped catalyst support material may be described as Cu-CZLYA, where Cu is the copper oxide, L is the lanthanum oxide, and Y is the yttrium oxide.

Figure 1A:
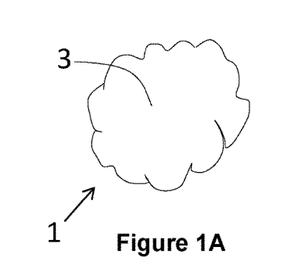
FIG. 1A is a schematic representation of the bulk catalyst support materials or powder prepared according to the teachings of the present disclosure.
Figure 1B:
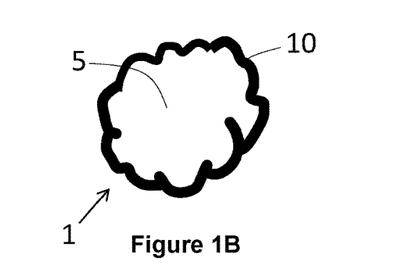
FIG. 1B is a schematic representation of layered texture catalyst support materials or powder prepared according to the teachings of the present disclosure.
Figure 1C:
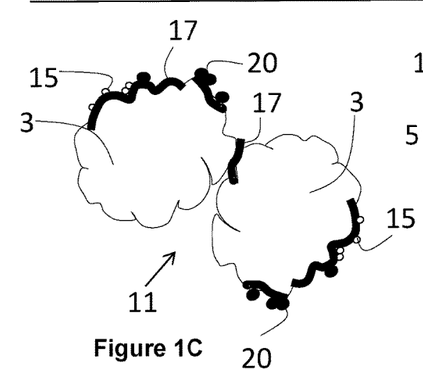
FIG. 1C is a schematic representation of a wash coat composition comprising the bulk catalyst support material of FIG. 1A with additional commercial Ce—$ZrO_2$.
Figure 1D:
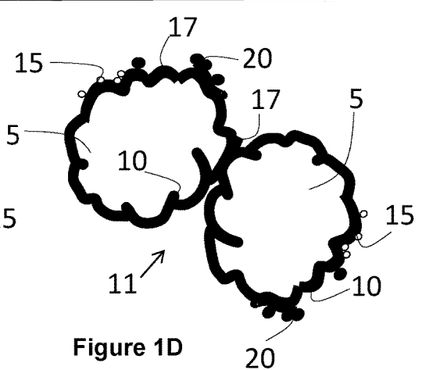
FIG. 1D is a schematic representation of a wash coat composition comprising the layered texture catalyst support material of FIG. 1B with additional commercial Ce—$ZrO_2$.
Figure 1E:
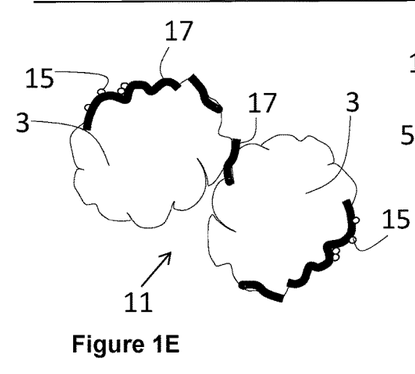
FIG. 1E is a schematic representation of a wash coat composition comprising the bulk catalyst support material of FIG. 1A without additional commercial Ce—$ZrO_2$.
Figure 1F:
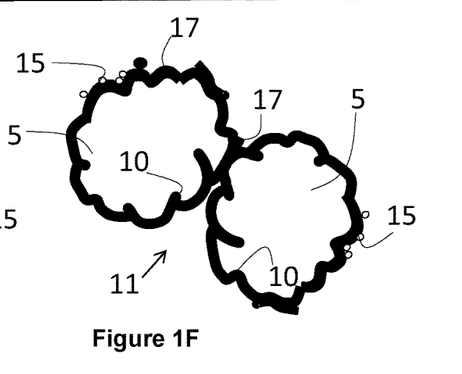
FIG. 1F is a schematic representation of a wash coat composition comprising the layered texture catalyst support material of FIG. 1B without additional commercial Ce—$ZrO_2$.

Referring to FIG. 1A, the catalyst support materials 1 provided herein may be a homogeneous bulk distributed material 3 whose structure corresponds to formula F-1. When desirable, the catalyst support materials 1 provided herein may also include layer texture materials that comprise a catalyst support core 5 that is at least partially covered with a solid solution or coating 10 as shown in FIG. 1B. The catalyst support core powders 5 may be prepared by batch or continuous co-precipitation and have as structure that corresponds to formula (F-2):

$$vD:x_1(Ce_{1-w}Zr_wO_2):y_1M:zL:(1-x-y-z)Al_2O_3 \quad (F-2)$$

The catalyst support solid solution used to coat the core powders may correspond to formula (F-3):

$$x_2(Ce_{1-w}Zr_wO_2):y_2M \quad (F-3)$$

with $x_2=x-x_1$ and $y_2=y-y_1$. The solid solution is coated onto the core powders, in which $0 \leq x_1/x \leq 1$, alternatively $0.2 \leq x_1/x \leq 0.8$, or alternatively $0.4 \leq x_1/x \leq 0.6$, and $0 \leq y_1/y \leq 1$, alternatively, $0.2 \leq y_1/y \leq 0.8$, or alternatively $0.4 \leq y_1/y \leq 0.6$.

The catalyst support core powders may be prepared via a co-precipitation method, a secondary precipitation method, or an incipient wetness method. Alternatively, the catalyst support core powders are prepared via a co-precipitation method. The basic solution and acidic solution used for the co-precipitation can be $NaAlO_2$ solution and nitrate solutions of cerium, zirconium and other rare earth and alkaline earth or transition metal elements, respectively. Also basic solutions of ammonia solution, ammonium carbonate and ammonium hydrogen carbonate or their mixture and acidic mixture nitrates solution of aluminum, cerium, zirconium, other rare earth and alkaline earth or transition metal elements can be used to neutralize the acidic solution to make the catalyst support core powders.

During the co-precipitation, the pH may be selected to be in the range of about 6 to about 10, alternatively in the range of about 7 to about 9; and the precipitation temperature selected to be in the range of about 48 to 80° C. Under this condition, pseudo-boehmite can be precipitated. The precipitate is then filtered, washed and finally dried with or without surfactants to obtain a precursor of the core powders. When utilized, the surfactants may include anyone or a combination of polyvinyl alcohol (PVA), polyvinyl amine, polyethylene glycol-200 (PEG-200), isopropyl alcohol (IPA), ethanol, and melamine with the dosage or amount ranging from about 1% to about 30%, alternatively about 6 to about 10%. The solid core powder precursor is calcined at about 500 to about 1100° C. for about 2-6 hours to get oxide core powders of the catalyst support. Alternatively, the precursor is subjected to calcination at about 600° C. to about 1,000° C. for about 3-5 hours. Alternatively, the precursor is subjected to calcination at about 900° C. for about 3 hours.

The solid solution, $x_2(Ce_{1-w}Zr_wO_2):y_2M$ may be coated on the catalyst support core powders using a solution of acetate or nitrate of cerium, zirconium, alkaline earth elements, transition metal elements and other rare earth elements using an incipient wetness impregnation method or a spray drying method, in which the dried powders are obtained by oven drying during the incipient wetness impregnation method. The coated powders are then calcined in a furnace at a higher temperature that ranges between about 500 and about 1100° C. for about 3-6 hours. The final products have a texture comprising the catalyst support core covered or coated by the solid solution.

According to another aspect of the present disclosure, when $x_1/x=1$ and $y_1/y=1$, the catalyst support materials may be prepared as homogeneous bulk distributed materials. Batch or continuous co-precipitation can be used for making this type of materials. The basic solution and acidic solution used in co-precipitation can be $NaAlO_2$ solution and nitrate solution of cerium, zirconium, other rare earth elements, and alkaline earth or transition metal elements, respectively. Also ammonia solution, ammonium carbonate and ammonium hydrogen carbonate and the mixture nitrates solution of aluminum, cerium, zirconium, other rare earth elements, and alkaline earth or transition metal elements can be used for the co-precipitation. The pH may be chosen to be in the range of about 6 to about 10, alternatively in the range of about 7 to about 9. The precipitation temperature is selected to be in the range of about 48 to 80° C.

The precipitate is filtered, washed and then spray dried or oven dried with or without surfactants to become a dried hydrate ready for calcination, in which the surfactants may include anyone or a combination of polyvinyl alcohol (PVA), polyvinyl amine, polyethylene glycol-200 (PEG-200), isopropyl alcohol (IPA), ethanol. The amount or dosage of the surfactant is in the range of 1% to 30%, alternatively about 6% to about 10%. The precursor is then subjected to calcination at about 500 to 1100° C. for about 3-6 hours to get final oxide powders of the catalyst support.

According to another aspect of the present disclosure, spray pyrogenation of acetate or nitrate solution of cerium, zirconium, rare earth elements, and alkaline earth elements or transition metal elements, as well as aluminum, can be used for making the bulk catalyst support materials. After spray pyrogenation, the powders can be subjected to calcination according to the procedures and parameters described above.

The catalyst support materials 1, either as layer textures 5, 10 or bulk 3 materials prepared according to the teachings of the present disclosure exhibit high thermal stability. For example, the materials that are subjected to calcination at 900° C. for 3 hours exhibit a surface area (SA) that is at least 80 m$^2$/g; alternatively, at least 60 m$^2$/g. After aging at 1,000° C. for 20 hours in air, the aged SA is measured to be greater than 60 m$^2$/g. After hydrothermal aging in a 10% water vapor (steam)/90% air environment at 1,000° C. for 4 hours the SA is greater than 45 m$^2$/g; alternatively, greater than 55 m$^2$/g; alternatively, greater than 65 m$^2$/g. After hydrothermal aging at 1,100° C. for 4 hours the SA is greater than 15 m$^2$/g; alternatively greater than 20 m$^2$/g; alternatively, about 25 m$^2$/g or higher.

The catalyst support materials prepared according to the teachings of the present disclosure have a particle size ($D_{50}$) of about 1 micrometer (μm) to about 100 μm; alternatively about 5 μm to about 75 μm; alternatively, about 10 μm to about 50 μm. For the purpose of this disclosure, a $D_{50}$ particle size corresponds to the conventional definition of being the median diameter or the medium value of the particles measured in a particle size distribution. In other words, it is the value of the particle diameter at 50% in the measured cumulative distribution. For example, if $D_{50}$=6 μm, then 50% of the particles in the sample are larger than 6 μm, and 50% smaller than 6 μm.

The catalyst support materials also have higher oxygen storage capacity than conventional products made from a mechanical mixture of La-Alumina and Zirconia stabilized Ceria before and after aging at high temperature of up to about 1,100° C. The doped catalyst support material lowers the activation temperature at which reduction occurs by at least 35% relative to a similar catalyst support material without the inclusion of the dopant (D). Alternatively, the activation temperature is lowered by at least 50%; alternatively, the activation temperature is lowered by 65% or more.

According to another aspect of the present disclosure, a wash coat composition is provided that comprises a combination of support materials having the weight ratios shown in formula (F-4):

(α)RE-Ce—ZrO$_2$+(β)D-CZMLA+(1−α−β)RE-Al$_2$O$_3$     (F-4)

where RE-Ce—ZrO$_2$ is a commercial OSC material of rare earth element stabilized ceria zirconia having a weight ratio (α) ranging from 0 to about 0.7 and D-CZMLA is a material prepared according to the teachings of the present disclosure having a weight ratio (β) ranging from about 0.2 to about 1 with (α+β)≤1. RE-Al$_2$O$_3$ is a rare earth elements stabilized alumina support having a weight ratio equal to (1−α−β). The alumina support may be comprised of a weak gamma phase, alternatively comprised of other phases or a mixture thereof. In the case where (α+β)=1, there is no RE-Alumina component present in the composition and in the case when α=0 there is no commercial ceria zirconia present in the composition.

Referring now to FIGS. 1C-1F, upon combining platinum group metals (PGM) 15 with the previously defined catalyst support materials 1 (FIGS. 1A & 1B) and an adhesive 17 that is in contact with at least a portion of the catalyst support materials 1, a wash coat 11 is formed. This wash coat may optionally comprise an amount of a commercial RE-Ce—ZrO$_2$ oxide 20. The wash coat 11 of the present disclosure that is formed requires less RE-Ce—ZrO$_2$ oxide 20 and/or less PGM 15 (FIGS. 1C & 1D) or will not require the commercial RE-Ce—ZrO$_2$ oxide 20 (FIGS. 1E & 1F) in forming an emission control catalyst capable of being used in many different applications, including but not limited to use with gasoline and diesel engines.

The wash coat composition 11 exhibits an activation temperature that is at least 50° C. lower, alternatively at least 75° C. lower, than the activation temperature of a conventional wash coat formulation that includes a mixture of RE-Ce—ZrO$_2$ and RE-Al$_2$O$_3$ or a wash coat formulation that is similar to that of the present disclosure except for the inclusion of a dopant (D) as described in Formula (F-5) shown below.

(α)RE-Ce—ZrO$_2$+(β)CZMLA+(1−α−β)RE-Al$_2$O$_3$     (F-5)

In addition, the wash coat composition of the present disclosure incorporates one or more platinum group metals (PGM) in an amount that is at least 10 wt. % less, alternatively at least 25 wt. % less, alternatively at least 50 wt. % less, alternatively at least 65 wt. % less, than the amount of PGM incorporated in a conventional wash coat formulation that includes a mixture of RE-Ce—ZrO$_2$ and RE-Al$_2$O$_3$ and exhibits at least a similar level of catalytic performance. Similarly, the wash coat composition of the present disclosure incorporates one or more platinum group metals (PGM) in an amount that is at least 10 wt. % less, alternatively at least 15 wt. % less, alternatively at least 25 wt. % less, alternatively at least 35 wt. % less, than the amount of PGM incorporated in a wash coat formulation as described by formula F-5 and that is further described in International Publication No. WO 2012088373A3, the entire content of which, are hereby incorporated by reference.

The following specific examples are given to illustrate the disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

In the following example, a HORIBA LA-920 laser particle sizer is used for the measurement of particle size distribution, a Rigaku MiniFlex II DESKTOP X-ray diffractometer is used for the measurement of phase, a Micromeritics TriStar II 3020 Surface Area and Porosity is used for the measurement of BET and a Spectro Analytical Instruments Model FCPSA83D ICP is used for analysis of chemical compositions. The hydrothermal aging is conducted in a quartz tube furnace equipped with a vapor generator using a volume of 10% vapor with the balance being air at about 1000° C. for about 20 hours and an air flow rate of about 4.2 L/min. A Micromeritics Autochem 2920 II is used to test temperature programmed reduction (TPR). The TPR is measured from 25° C. to 900° C. with a temperature ramp rate of 30° C./min and a constant 90% argon/10% hydrogen gas flow rate of 5 cm$^3$/min. All samples are hydrothermally aged for TPR measurements.

Example

Nitric acid is used to dissolve cerium carbonate, zirconium carbonate, yttrium oxide, lanthanum oxide and CuO to form a mixed metals nitrate solution in which the dissolved species have an oxide ratio of CeO2:ZrO2:Y2O3:La2O3:CuO that is equal to about 32:23:1.5:1.5:2. Then 34 wt. % hydrogen peroxide was added into the solution with weight ratio of $H_2O_2$:oxides being between about 1:2 to 1:1. Sodium hydroxide was used to dissolve aluminum hydroxide and form a sodium aluminate solution. The mixed metals nitrate and sodium aluminate solutions were then mixed in a batch process to form a neutralized solution with a pH=7 at a temperature of 75° C. The ratio of alumina to mixed metal oxides in the neutralized solution is about 40:60.

After precipitation, the temperature was increased to 90° C. to age the slurry for 30 minutes and then cooled to 40° C. A surfactant was added into the slurry with a weight percentage of 30 to 50 wt. % based on total weight of the oxide. The slurry was stirred for 1 hour then collected and washed with deionized (D.I.) water. The wet solid (e.g., wet cake) was dried at 120° C. for about 12 hours in an oven followed by powdering and sifting to obtain a dry powder. The resultant powder was then subjected to calcination at 900° C. for 3 hours to get final product characterized as 2% Cu-CZLYA40, wherein 2% Cu represents the copper oxide, CZ the ceria-zirconia, L the lanthanum oxide, Y the yttrium oxide, and A40 the 40% alumina.

The calcined catalyst support material was then characterized in both a fresh (Run No. R-1) material and after being aged at 1,000° C. (Run No. R-2) and at 1,100° C. (Run No. R-3) for a period of 4 hours. The measured results from this characterization include values for surface area, pore volume, and pore diameter as shown in Table 1 below.

TABLE 1

|  | Surface Area (m²/g) | Pore Volume (cm³/g) | Pore Diameter (nm) |
| --- | --- | --- | --- |
| R-1 | 85.31 | 0.701 | 32.8 |
| R-2 | 68.63 | 0.529 | 21.7 |
| R-3 | 24.79 | 0.189 | 30.5 |

The surface area measured for the fresh material (Run #. R-1) was about 85 m²/g, which only slightly reduced upon aging at 1,000° C. (Run # R-2) to about 69 m²/g and which was further reduced upon aging at 1,100° C. (Run # R-3) to about 25 m²/g. The pore volume measured for the fresh material (Run # R-1) was about 0.7 cm³/g, which only slightly reduced upon aging at 1,000° C. (Run # R-2) to about 0.5 cm³/g and which was further reduced upon aging at 1,100° C. (Run # R-3) to about 0.2 cm³/g.

Figure 2:
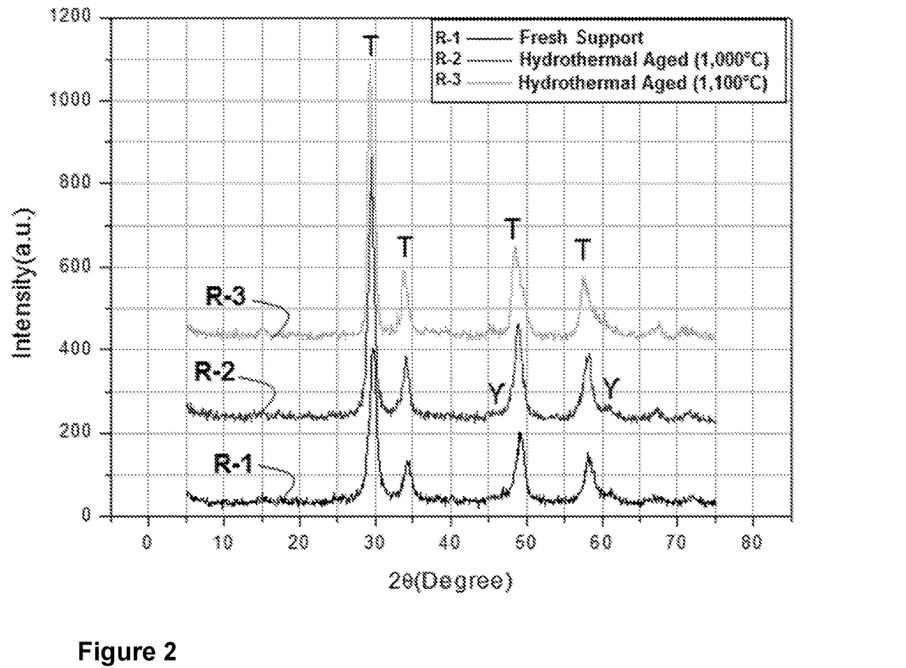
FIG. 2 is a graphical comparison of the XRD patterns of fresh and hydrothermal aged catalyst support materials.

Referring now to FIG. 2, x-ray diffraction (XRD) patterns for the doped catalyst material are shown in fresh form (Run No. R-1), after being aged at 1,000° C. (Run No. R-2) and after being aged at 1,100° C. (Run No. R-3). In each case, the XRD pattern establishes the presence of a strong tetragonal (T) phase for the ceria-zirconia component and a weak gamma phase for the alumina component in the catalyst support material. The aged samples (Run No.'s R-2 & R-3) exhibit higher crystallinity in the ceria-zirconia without phase separation.

Figure 3A:
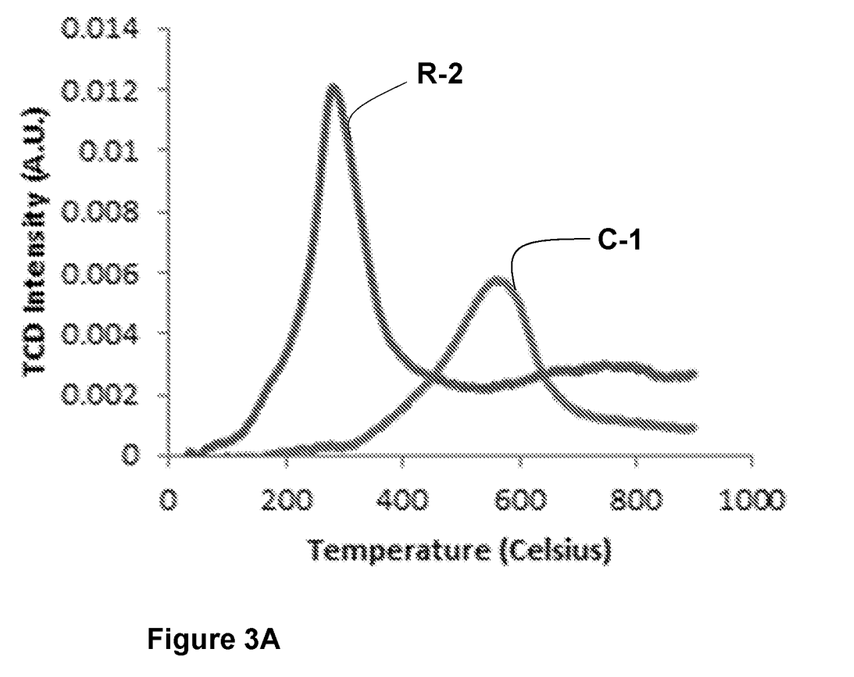
FIG. 3A is a graphical comparison of the temperature programmed reduction of catalyst support materials with and without the dopant at 1,000° C.
Figure 3B:
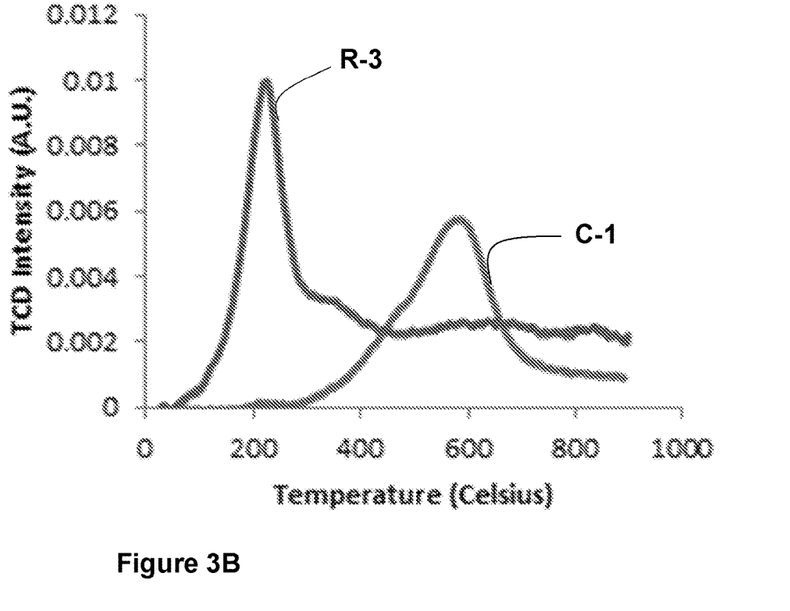
FIG. 3B is a graphical comparison of the temperature programmed reduction of catalyst support materials with and without the dopant at 1,100° C.

Referring now to FIGS. 3A and 3B the doped catalyst support material, namely, 2% Cu-CZLYA40 (Run No.'s R-2 & R-3) and a similar catalyst support material without the presence of a dopant, namely CZLYA40 (Run C-1), were used in a temperature-programmed reduction (TPR) analysis. TPR is a technique that is commonly used to characterize solid materials and to find the most efficient reduction conditions. The TPR profile that is measured for the CZLY40 (Run C-1) exhibits a peak at about 550° C. (see both FIGS. 3A and 3B). The TPR profile of ceria-zirconia is characterized by wide peak in the region of 300° C. to 600° C., which is believed to be related to the reduction of surface capping oxygen species on ceria-zirconia. The presence of the dopant in the CZLYA40 support material induces a shift of the reduction to a lower temperature as shown by the peak at around 200° C. for the 2% Cu-CZLYA40 (Run No.'s R-2 & R-3) catalyst support material. Thus inclusion of the dopant in the catalyst support material lowers the activation temperature by about ⅔ or 66%. The dopants were also found to increase the oxygen storage capacity of the support material, which is believed to be caused by the ability of the dopants to store oxygen at different oxidation states.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various embodiments of the present disclosure has been presented for purposes of illustration and description. It is not intended to be exhaustive or to limit the present disclosure to the precise embodiments disclosed. Numerous modifications or variations are possible in light of the above teachings. The embodiments discussed were chosen and described to provide the best illustration of the principles included in the present disclosure and its practical application to thereby enable one of ordinary skill in the art to utilize the teachings of the present disclosure in various embodiments and with various modifications as are suited to the particular use contemplated. All such modifications and variations are within the scope of the present disclosure as determined by the appended claims when interpreted in accordance with the breadth to which they are fairly, legally, and equitably entitled.

What is claimed is:

1. A catalyst support material with oxygen storage capacity, the catalyst support material comprising:
   ceria-zirconia; the ceria-zirconia having oxygen storage capacity;
   an interactive promoter (M) for oxygen storage;
   an aluminum oxide support;
   a stabilizer (L) for the aluminum oxide support; and
   an oxidizing dopant (D); wherein D is selected as an alkaline earth oxide or a transition metal oxide;
   wherein the catalyst support material (D-CZMLA) has the formula F-1:

$$vD: x(Ce_{1-w}Zr_wO_2):yM:zL:(1-v-x-y-z)Al_2O_3 \qquad (F-1)$$

in which w is a molar ratio between 0.1 and about 0.8; and v, x, y, and z are weight ratios, such that v is in the range of 0.005 to 0.15; x is within the range of about 0.05 to about 0.80, while y is within the range of 0.001 to about 0.10 and z is within the range of 0.001 to about 0.10;
   wherein the support material further comprises a catalyst support core powder having a formula F-2:

$$vD: x_1(Ce_{1-w}Zr_wO_2):y_1M:zL:(1-v-x-y-z)Al_2O_3 \qquad (F-2)$$

and a solid solution coated onto the core powder having a formula F-3:

$$x_2(Ce_{1-w}Zr_wO_2):y_2M \qquad (F-3)$$

wherein $x_2=x-x_1$ and $y_2=y-y_1$ and in which $0.2 \leq x_1/x \leq 0.8$ and $0.2 \leq y_1/y \leq 0.8$.

2. The catalyst support material of claim 1, in which the combined weight percentage range of the dopant, the ceria-zirconia, the interactive promoter, and the stabilizer (v+x+y+z) is from about 5 to about 80 wt. % relative to the total oxides in the support material.

3. The catalyst support material of claim 1, wherein M and L are independently selected as a rare earth oxide.

4. The catalyst support material of claim 3, wherein D is an oxide of copper, cobalt, iron, nickel, titanium, vanadium, strontium, barium, or a mixture thereof.

5. The catalyst support material of claim 3, wherein M and L are compositionally different from one another.

6. The catalyst support material of claim 3, wherein M is lanthanum oxide, L is yttrium oxide, and D is copper oxide.

7. The catalyst support material of claim 1, wherein the ceria-zirconia exhibits a cubic or tetragonal phase and the alumina exhibits a weak gamma phase.

8. The catalyst support material of claim 1, wherein the catalyst support material has a fresh specific surface area (SSA) of greater than 80 m²/g.

9. The catalyst support material of claim 1, wherein the catalyst support material has a specific surface area (SSA) of greater than 45 m²/g when hydrothermal aged at 1,000° C.

10. The catalyst support material of claim 1, wherein the catalyst support material has a specific surface area (SSA) of greater than 20 m²/g when hydrothermal aged at 1,100° C.

11. The catalyst support material of claim 1, wherein the catalyst support material has a particle size ($D_{50}$) in the range of 1 to 100 microns.

12. A wash coat for a catalyst having high thermal stability and oxygen storage capacity (OSC) for use in an automobile engine exhaust converter, the wash coat comprising:
at least one platinum group metal (PGM);
an adhesive; and
a mixture of catalyst supports according to the formula F-5:

$$(\alpha)RE\text{-}Ce\text{-}ZrO_2 + (\beta)D\text{-}CZMLA + (1-\alpha-\beta)RE\text{-}Al_2O_3 \qquad (F\text{-}5)$$

wherein, RE-Ce—$ZrO_2$ is an OSC material of rare earth elements stabilized ceria zirconia having a weight ratio ($\alpha$) ranging from 0 to about 0.7; D-CZMLA is a doped catalyst support material having a weight ratio ($\beta$) ranging from about 0.2 to about 1 such that ($\alpha+\beta$)≤1; and RE-$Al_2O_3$ is a rare earth elements stabilized alumina support having a weight ratio equal to (1-$\alpha$-$\beta$);
wherein the composition of the D-CZMLA comprises:
ceria-zirconia; the ceria-zirconia having oxygen storage capacity;
an interactive promoter (M) for oxygen storage;
an aluminum oxide support;
a stabilizer (L) for the aluminum oxide support; and
an oxidizing dopant (D); wherein D is selected as an alkaline earth oxide or a transition metal oxide;
wherein the catalyst support material (D-CZMLA) has the formula F-1:

$$vD{:}x(Ce_{1-w}Zr_wO_2){:}yM{:}zL{:}(1-v-x-y-z)Al_2O_3 \qquad (F\text{-}1)$$

in which w is a molar ratio between 0.1 and about 0.8; and v, x, y, and z are weight ratios, such that v is in the range of 0.005 to 0.15; x is within the range of about 0.05 to about 0.80, while y is within the range of 0.001 to about 0.10 and z is within the range of 0.001 to about 0.10;
wherein the support material further comprises a catalyst support core powder having a formula F-2:

$$vD{:}x_1(Ce_{1-w}Zr_wO_2){:}y_1M{:}zL{:}(1-v-x-y-z)Al_2O_3 \qquad (F\text{-}2)$$

and a solid solution coated onto the core powder having a formula F-3:

$$x_2(Ce_{1-w}Zr_wO_2){:}y_2M \qquad (F\text{-}3)$$

wherein $x_2=x-x_1$ and $y_2=y-y_1$ and in which 0.2 $x_1/x$≤0.8 and 0.2≤$y_1/y$≤0.8.

13. The wash coat of claim 12, wherein the wash coat has an activation temperature that is at least 35% lower than the activation temperature of a similar wash coat formulation that does not include the dopant.

14. The wash coat of claim 13, wherein the wash coat has an activation temperature that is at least 50% lower than the activation temperature of a similar wash coat formulation that does not include the dopant.

15. The wash coat of claim 12, wherein the weight percentage range of ceria-zirconia, interactive promoter, and stabilizer (x+y+z) in the D-CZMLA is from about 5 to about 80 wt. % relative to the total oxides in the D-CZMLA;
M and L in the D-CZMLA are independently chosen as a rare earth metal oxide.

16. The wash coat of claim 12, wherein M and L in the D-CZMLA are compositionally different from one another.

17. The wash coat of claim 12, wherein the D-CZMLA is formed by a method comprising:
providing a basic solution of an aluminum oxide precursor;
providing an acidic solution, the acidic solution including precursors to the cerium zirconia, the interactive promoter, the dopant, and the stabilizer;
mixing the basic solution and the acidic solution together to form a neutralized solution;
allowing the neutralized solution to further mix at a predetermined temperature causing a precipitate to form;
filtering the neutralized solution to collect the precipitate;
washing the precipitate to remove soluble impurities;
adding the precipitate to water to form a slurry;
spray drying the slurry to obtain the catalyst support core powder;
calcining the catalyst support core powder at a predetermined temperature; and
optionally, coating a solid solution onto the catalyst support core powder.

18. The wash coat of claim 17, wherein the method further includes the step of adding at least one surfactant to the slurry, the surfactant selected as one from polyvinyl alcohol (PVA), polyvinyl amine, polyethylene glycol-200 (PEG-200), isopropyl alcohol (IPA), ethanol, and melamine, or combination thereof.

* * * * *